No. 757,864. PATENTED APR. 19, 1904.
J. FRYE.
BROILER.
APPLICATION FILED APR. 9, 1903.
NO MODEL.
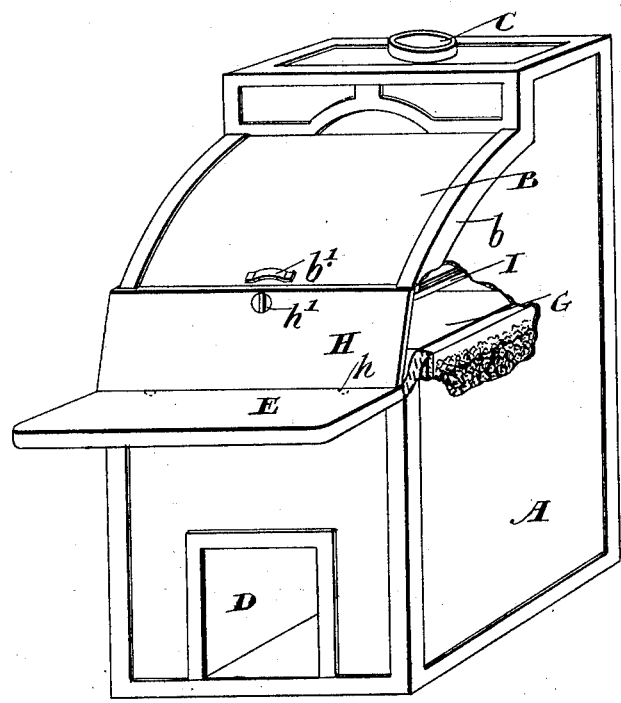
Fig. 1.
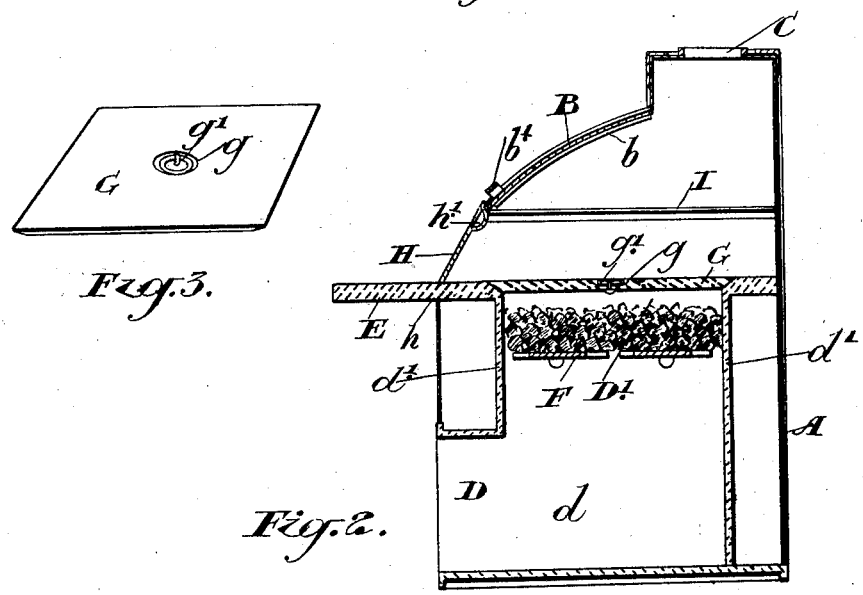
Fig. 3.
Fig. 2.
Witnesses  Inventor.

No. 757,864. Patented April 19, 1904.

UNITED STATES PATENT OFFICE.

JAMES FRYE, OF TORONTO, CANADA.

BROILER.

SPECIFICATION forming part of Letters Patent No. 757,864, dated April 19, 1904.

Application filed April 9, 1903. Serial No. 151,821. (No model.)

*To all whom it may concern:*

Be it known that I, JAMES FRYE, of the city of Toronto, in the county of York, in the Province of Ontario, Canada, have invented certain new and useful Improvements in Broilers, of which the following is a specification.

My invention relates to improvements in broilers; and the object of the invention is to devise a construction of broiler which may be readily adapted to use either hard coal or charcoal; and it consists, essentially, of a casing of any suitable form having a grate and bottom draft-orifice, a fire-brick removable cover for the grate, and a flap-damper in front of the shelf of the broiler, the parts being arranged and constructed in detail, as hereinafter more particularly explained.

Figure 1 is a perspective view of my improved broiler, part of the side being broken away to exhibit the interior construction. Fig. 2 is a vertical section through the broiler. Fig. 3 is a view of the removable fire-brick plate.

In the drawings like letters of reference indicate corresponding parts in each figure.

A is the main casing of the broiler.

B is the drop-front, which is substantially arc-shaped in form.

C is the stovepipe-hole.

D is the orifice at the bottom, which extends inwardly between the walls $d$, and D' is the fire-box, which extends up from the sides $d$. The sides of the fire-box I designate $d'$.

E is a shelf extending outwardly from the front wall of the fire-box.

F is the grate, upon which is designed to be placed the hard coal, and G is a plate made of fire-brick, which is provided with a central recess $g$ and a ring-handle $g'$. The drop-front moves in guideways $b$ and is raised by a handle $b'$.

H is a supplemental front or damper, which is hinged at $h$ on the shelf E and is provided with a handle $h'$, such handle being arranged so as to manipulate the front so that it may be dropped down onto the shelf E.

I represents shelves on each side of the interior of the case on which the gridiron is placed.

Having now described the principal parts involved in my invention, I shall briefly describe its operation and utility.

In order to use my broiler for coal, I remove the fire-brick plate G and place the supplemental front H in the position shown in Figs. 1 and 2. Should I desire to use the broiler with charcoal, I place the plate G in position and swing down the supplemental front H and place the charcoal in the usual manner on the top of the plate.

It will thus be seen that I am able to use my broiler either with coal or charcoal, depending, of course, on the nature of the cooking, as I find in some classes of cooking I may prefer to use one or the other.

What I claim as my invention is—

In combination in a broiler, a casing having an arc-shaped top front, a grate in the casing, said casing having an opening leading from the grate to the outside of the casing, and an opening C in the top of the casing for the products of combustion, shelves in the casing above the grate, a hinged plate H, and a plate made of fire-brick covering the said grate when the broiler is to be used with charcoal, substantially as described.

JAMES FRYE.

Witnesses:
 B. BOYD,
 M. McLAREN.